(No Model.)
A. W. OBERMANN.
SAUCEPAN.
No. 393,025. Patented Nov. 20, 1888.
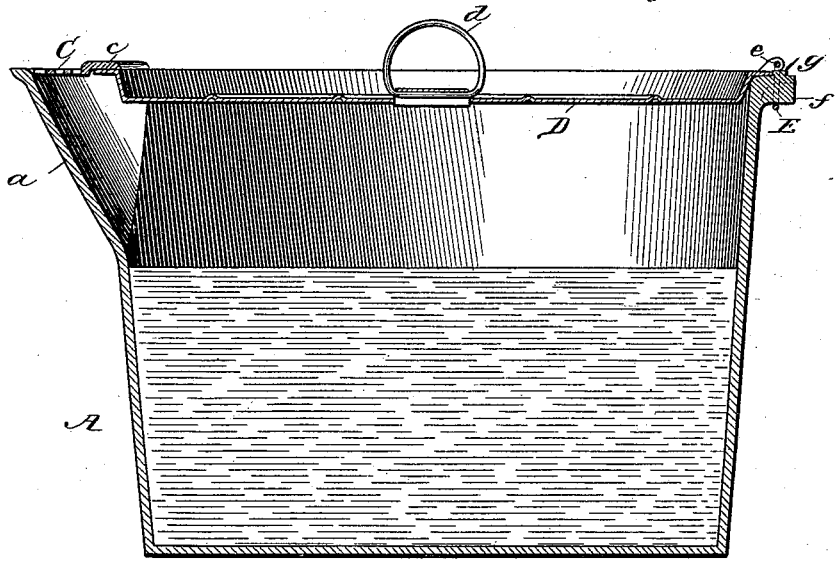
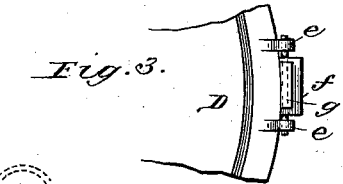
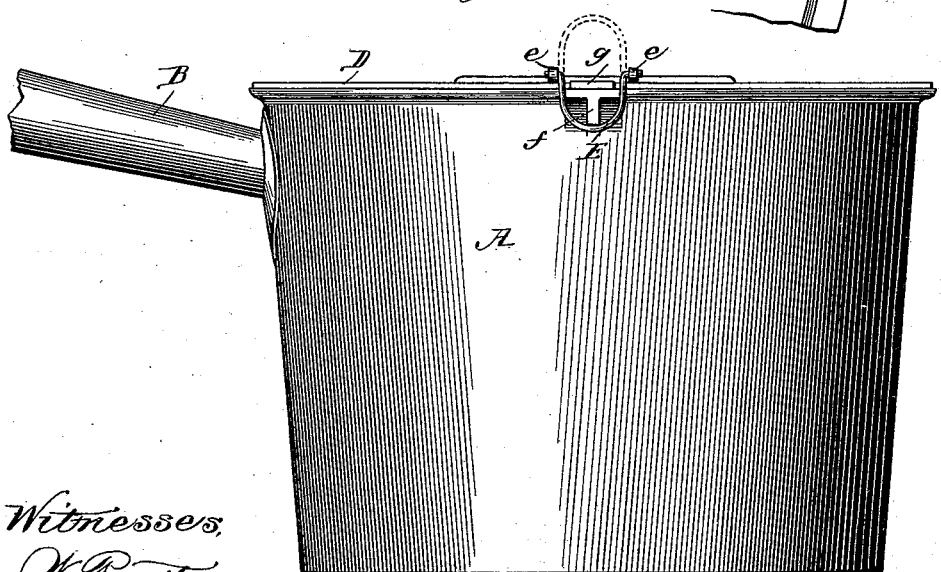

UNITED STATES PATENT OFFICE.

AUGUST W. OBERMANN, OF PITTSBURG, PENNSYLVANIA.

SAUCEPAN.

SPECIFICATION forming part of Letters Patent No. 393,025, dated November 20, 1888.

Application filed December 12, 1887. Serial No. 257,701. (No model.)

*To all whom it may concern:*

Be it known that I, AUGUST W. OBERMANN, a citizen of the United States of America, residing at Pittsburg, in the county of Allegheny and State of Pennsylvania, have invented certain new and useful Improvements in Saucepans, of which the following is a specification, reference being had therein to the accompanying drawings.

This invention relates to improvements on the Letters Patent Nos. 334,459 and 349,317, granted to me respectively on January 19, 1886 and on September 21, 1886, and it has for its object to provide a simple device for locking the cover of a saucepan or other cooking utensil, to hold it rigidly thereon while pouring out the liquid contents through the spout thereof, which spout may be provided with one of my strainer attachments; and with that object in view my invention consists of the novel devices and combinations of devices hereinafter described and specifically claimed.

In the accompanying drawings, Figure 1 represents a longitudinal vertical section of a saucepan having my improvement, and Fig. 2 a side elevation of the same; and Fig. 3 is a plan of the cover-locking device.

Corresponding referential characters designate like parts in all the figures.

A denotes the saucepan or other kitchen utensil, having a handle, B, and a spout, *a*, provided with my patent strainer attachment C. This strainer attachment has a somewhat raised flange, *c*, under which the edge of cover D is inserted, while the opposite edge of this cover D is provided with a small bail, E, swinging in eyes *e*, that are rigid with said cover. A lug, *f*, which may be T-shaped, semicircular, or of any other suitable shape conforming with the shape of bail E, is cast or otherwise fixed to the upper edge of the saucepan diametrically opposite of spout *a*, over which lug the bail E will swing in a manner that the same, when turned to a downwardly-vertical position, will engage therewith, and will then form a safe locking device for holding the cover upon the saucepan and for preventing its dropping off while turning the saucepan to an inclined position; and, for the purpose of providing for the cover a rigid position upon the rim of the saucepan, a shoulder projection, *g*, is cast or otherwise formed upon lug *f*, inside of which the edge of the cover D drops, holding the same from sliding laterally. In addition to the handle *d* secured upon the middle of the cover D, bail E, when disengaged from the lug *f*, will also form a convenient handle for placing or removing the cover D.

This device, as will be noticed, is very simple in its construction and convenient in its use, and when emptying the saucepan it will insure the hand of the cook against being scalded by escaping vapor.

Although I generally apply this cover-locking device to saucepans or other cooking utensils provided with my patent strainer attachment, yet by fixing flange *c* or hook-shaped lugs upon the spout portion of the pan-rim for engaging the cover the device can be used as well without the strainer attachment.

What I claim is—

1. In a saucepan or other cooking utensil, the combination, with the spout *a* and a flange, *c*, extending across the mouth of said spout, of the cover D, inserted at one side under flange *c*, and having a bail, E, upon it at the opposite side, and the lug *f* on the side of the saucepan of a size to fit in the said bail when turned down, as set forth.

2. The combination, with a saucepan or other cooking utensil provided with a spout, *a*, a flange, *c*, extending across the mouth of said spout, a lug, *f*, on the opposite side of said utensil, and a shoulder, *g*, on the upper edge of the utensil over the lug, of a lid, D, inserted under flange *c* on one side and abutted by shoulder *g* on the other, and the bail E for turning over lug *f*, as set forth.

3. The combination, with a saucepan or other cooking utensil provided with a strainer attachment, C, over the spout thereof, said strainer having a raised flange, *c*, and a lug, *f*, on the opposite side of the utensil, having a projection or shoulder, *g*, of lid or cover D, fitting under the flange *c* on one side and against shoulder *g* on the opposite side, and having bail E for engagement with lug *f*, as set forth.

In testimony whereof I affix my signature in presence of two witnesses.

AUGUST W. OBERMANN.

Witnesses:
R. C. OEHMLER,
R. M. OEHMLER.